(12) United States Patent
Ambros

(10) Patent No.: US 8,770,903 B2
(45) Date of Patent: Jul. 8, 2014

(54) THREAD-PRODUCING NUT, BLANK FOR THE FABRICATION OF SAID NUT, AND BOLTED JOINT COMPOSED OF SAID NUT AND A BOLT

(75) Inventor: Olaf Ambros, Biblis (DE)

(73) Assignee: Baier & Michels GmbH & Co. KG, Ober-Ramstadt (DE)

( * ) Notice: Subject to any disclaimer, the term of this patent is extended or adjusted under 35 U.S.C. 154(b) by 0 days.

(21) Appl. No.: 13/883,703

(22) PCT Filed: Nov. 8, 2011

(86) PCT No.: PCT/EP2011/069601
§ 371 (c)(1),
(2), (4) Date: May 6, 2013

(87) PCT Pub. No.: WO2012/062728
PCT Pub. Date: May 18, 2012

(65) Prior Publication Data
US 2013/0223954 A1 Aug. 29, 2013

(30) Foreign Application Priority Data
Nov. 8, 2010 (DE) .......................... 10 2010 043 589

(51) Int. Cl.
*F16B 33/00* (2006.01)
(52) U.S. Cl.
USPC .................. 411/366.1; 411/432; 411/437
(58) Field of Classification Search
USPC .............. 411/238, 366.1, 417, 427, 432, 436, 411/437
See application file for complete search history.

(56) References Cited

U.S. PATENT DOCUMENTS

| | | | | |
|---|---|---|---|---|
| 3,331,272 A | * | 7/1967 | Hanneman | 411/369 |
| 4,347,636 A | * | 9/1982 | Capuano | 470/25 |
| 4,842,437 A | * | 6/1989 | Egner | 403/24 |
| 4,907,930 A | | 3/1990 | Peterson | |
| 5,073,073 A | * | 12/1991 | Kazino et al. | 411/386 |
| 6,170,858 B1 | | 1/2001 | Berger | |
| 6,406,238 B2 | * | 6/2002 | Takeuchi et al. | 411/188 |
| 2007/0286700 A1 | * | 12/2007 | Ladouceur | 411/333 |

FOREIGN PATENT DOCUMENTS

| | | |
|---|---|---|
| DE | 29614832 U1 | 1/1997 |
| EP | 0354446 A1 | 2/1990 |
| EP | 0554094 A1 | 8/1993 |
| WO | WO-2006117140 A2 | 11/2006 |

OTHER PUBLICATIONS

English translation of the International Preliminary Report on Patentability for International Application PCT/ EP2011/069601, WIPO May 8, 2013.
International Search Report for PCT/EP2011/069601, European Patent Office, Feb. 6, 2012.

* cited by examiner

*Primary Examiner* — Roberta Delisle
(74) *Attorney, Agent, or Firm* — Mannava & Kang, P.C.

(57) ABSTRACT

A thread-producing nut for a screwed connection, wherein a core hole which is provided with thread turns is designed for positively locking, frictionally locking and releasable connection to an, in particular, cylindrical bolt or pin, in such a way that the thread turns have completely formed thread turns in certain sections when viewed in the circumferential direction and that free spaces with thread turns which are formed incompletely in terms of their height are provided between the completely formed sections of the thread turns. Furthermore, a blank for manufacturing the nut and a screwed connection composed of such a nut and a bolt are disclosed herein.

11 Claims, 5 Drawing Sheets

Fig. 4B — Detail Y

Fig. 4A — Detail X

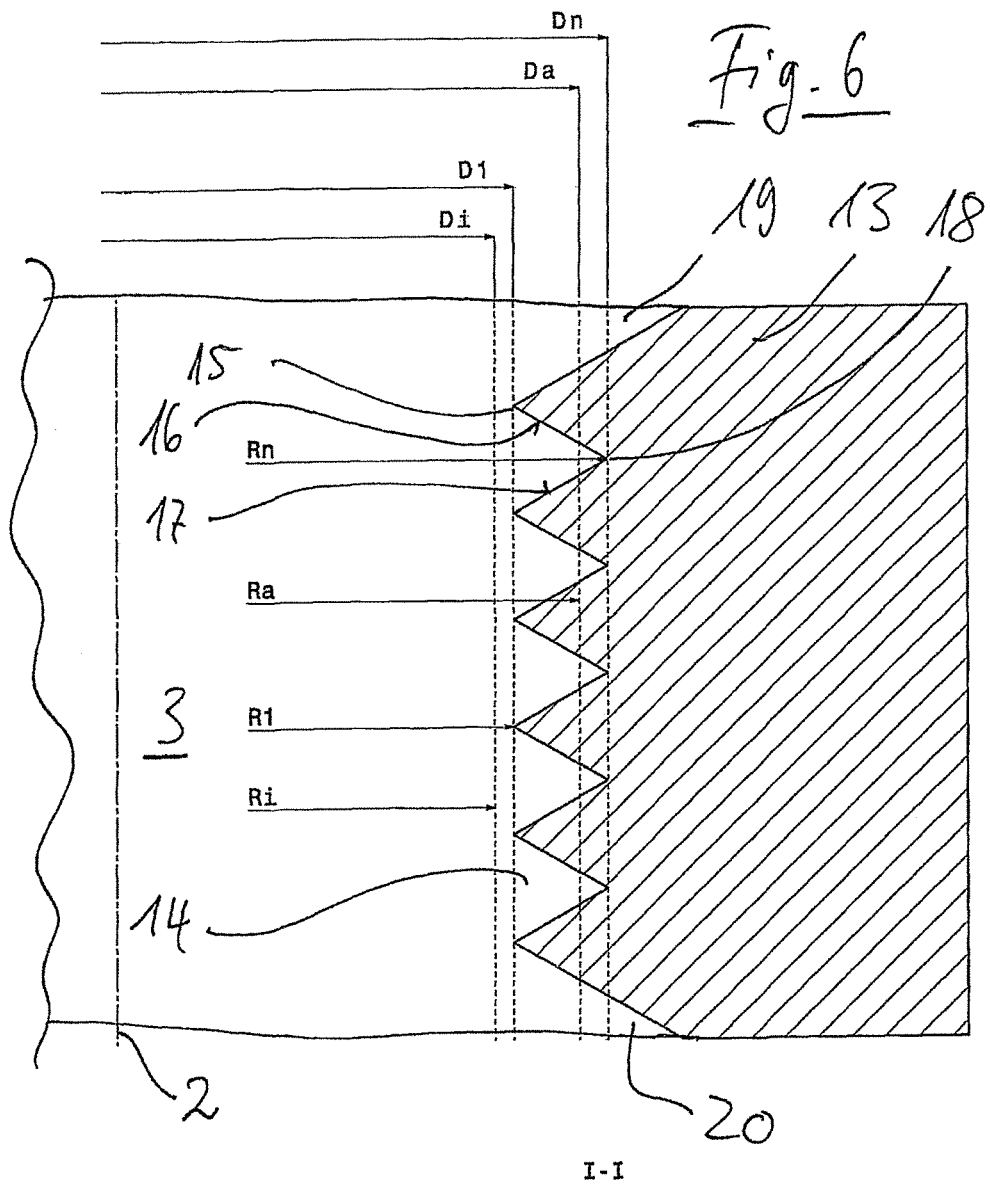

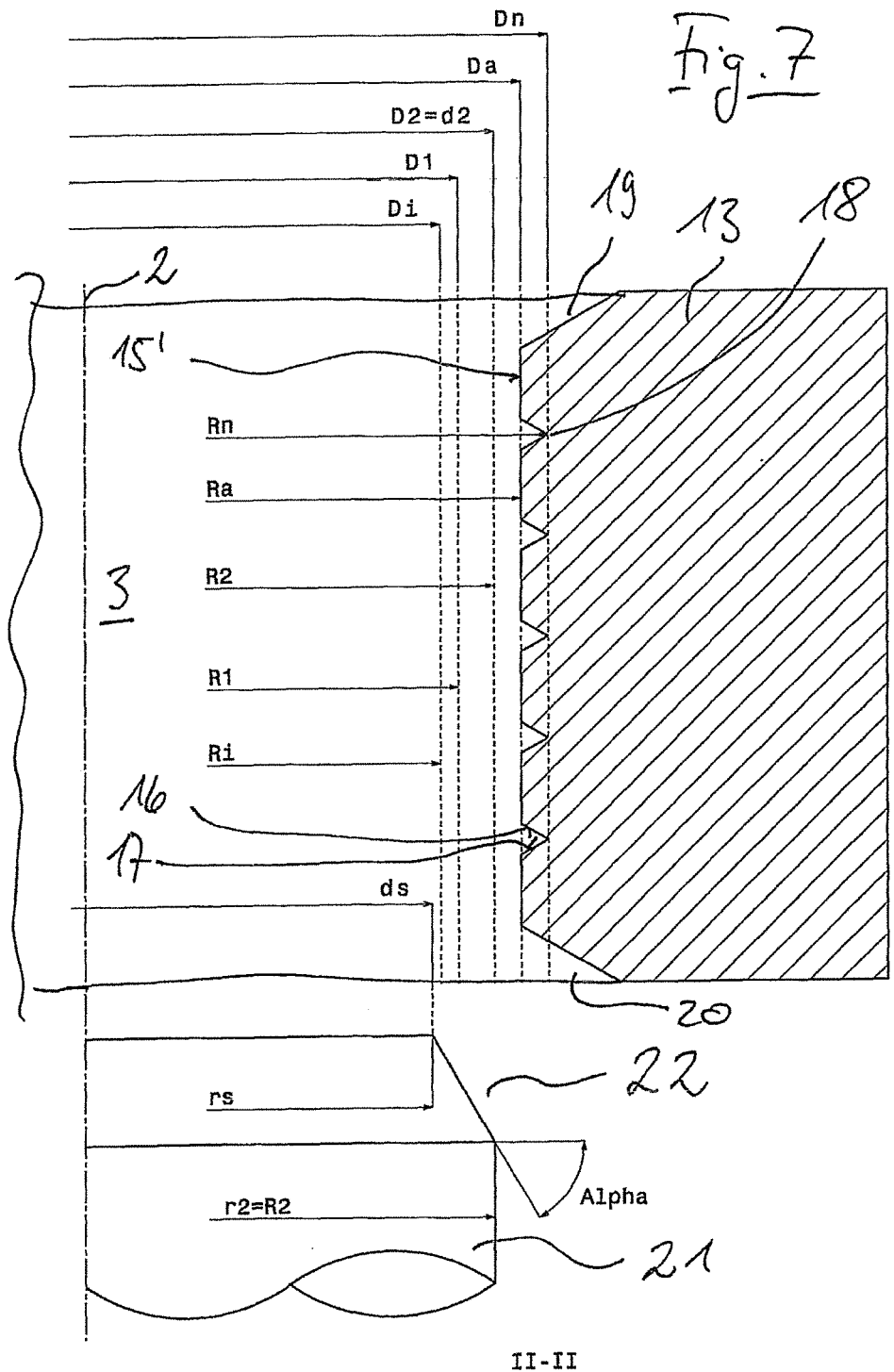

THREAD-PRODUCING NUT, BLANK FOR THE FABRICATION OF SAID NUT, AND BOLTED JOINT COMPOSED OF SAID NUT AND A BOLT

PRIORITY

The present application claims priority under 35 U.S.C. §371 to PCT Application PCT/EP2011/069601, filed on Nov. 8, 2011, which claims priority to German Patent Application No. 10 2010 043 589.9, filed on Nov. 8, 2010, the disclosures of which are hereby incorporated by reference in their entireties.

TECHNICAL FIELD

The invention relates to a thread-producing nut for a bolted joint, in which thread-producing nut a tap hole is provided which comprises threads for achieving a positive, nonpositive, and releasable connection of the nut to a bolt or stud, more particularly to a cylindrical bolt or stud. Furthermore, the invention relates to an unfinished part or a blank for the fabrication of said nut and to a bolted joint composed of said nut and a bolt.

PRIOR ART

Ordinary nuts comprise a tap hole, in which several threads are provided to enable the nut to be screwed onto the corresponding counterthread of a bolt. The nut is used, for example, for clamping a component in place by means of this bolted joint.

In order to achieve improved securing of the nut against self-loosening, DE 296 14 832 U1 discloses that a bolt comprising a self-cutting or self-tapping thread cuts or forms a thread in a preferably threadless nut and vice versa. If the counterpart, i.e. the nut for example, has already been provided with a thread, the latter is subjected to further machining by the self-cutting thread of the bolt. In the case of a self-tapping thread, for example, of a trilobular shape, the self-tapping thread further shapes the optionally existing thread of the counterpart or merely deforms it elastically. In any case, the nut is secured against self-loosening by means of a cutting, forming or elastic deformation process.

WO2006/117140A2 discloses a thread-forming nut for achieving a positive, nonpositive, and releasable connection with a cylindrical bearing journal or a stud, in which thread-forming nut the tap hole has a polygonal cross-section comprising three or more inwardly rounded forming lobes. The tap hole of the thread-forming nut may have a trilobular cross-section, and its thread can be provided with a radial profile. By selecting the diameter of the threaded portion and thus of the thread of the thread-forming nut, it is possible to control the load-bearing capacity and security of the bolted joint by simple means. The thread-forming nut can be made of tool steel so that a combination of materials involving hard and soft partners can be used for forming the thread.

If the threads of a bolt are clogged by a coating medium, the function of such a nut is restricted or even completely impaired by the coating medium. This is particularly true in the case of coatings that are applied by means of immersion processes and are characterized, due to the nature of these processes, by a more pronounced deposition of the coating medium usually on one side of the thread. In the prior art, it is therefore necessary to scrape the thread of the coated bolt such that it is free of the coating or to recut the thread. Occasionally, attempts are also made to solve the problem by the use of a nut of a significantly higher tolerance class, but this, in the case of heavy deposits of coating material, results in a seizure or an uncontrolled high torque when the nut is screwed onto the bolt provided with the thread.

SUMMARY OF THE INVENTION

The technical object to be achieved by the invention is to provide a nut that, due to the specific shape of its thread, is suitable for forming a completely functional thread on smooth bolts of a corresponding cross-section or for scraping already existing threads clogged by a coating medium such that they are freed from the coating with reasonable effort.

In a thread-producing nut of the invention for achieving a positive, nonpositive, and releasable connection with an especially cylindrical stud or a bolt, in which thread-producing nut a tap hole is provided, which comprises load-bearing threads disposed on a peripheral surface of the tap hole in the peripheral direction, the threads are complete over specific regions, when viewed in the peripheral direction, and free spaces are provided between said regions of perfectly formed threads, which free spaces comprise threads that are imperfectly formed in terms of their height.

A perfectly formed thread comprises a sharp-edged crest, flanks, and a root. An imperfectly formed thread, for the purposes of the present invention, comprises a root and flanks that do not converge to a crest, but merge instead into a flattened region. This flattened region constitutes a free space compared with the crest.

This nut is able to scrape existing threaded portions of coated components, the functioning of which is restricted or impaired by the coating medium, such that said threaded portions are freed from the coating medium, and thus cut down on an additional expensive process step, e.g. that of recutting the thread or laboriously covering the threaded portions prior to the coating operation.

Such a nut is additionally able to form a true to gauge and completely loadable thread on bolts which are made of most diverse materials, e.g. non-ferrous metals or steel without any removal of material, and in which usually a metric thread is to be created.

Advantageously, the load-bearing threads in the tap hole are disposed at their roots on a minor thread diameter Dn and at their crests on a major thread diameter D1, and the threads can comprise, at least in part, free spaces that widen the tap hole from the major thread diameter D1 towards the minor thread diameter Dn, which free spaces terminate on an outer circle diameter Da situated at a distance from the minor thread diameter Dn.

This distance makes it possible to influence the formation of a thread on the bolt in the region of the free spaces by causing the crests of the thread that are to be produced to be the smoothened and calibrating.

Advantageously, the threads can have a pitch diameter D2 located between the minor thread diameter Dn and the major thread diameter D1, and the outer circle diameter Da is smaller than the minor thread diameter Dn and at least as large as the pitch diameter D2.

This embodiment exhibits a satisfactory compromise in the design of the free spaces.

Furthermore, the free spaces can be in the form of the arc of a circle having a radius Rv, and the radius Rv can be smaller than 35% of the major thread diameter D1 and more particularly smaller than 25% of the major thread diameter D1, and the free space comprises a center located displaced from the center of the tap hole by not more than 75% of the major thread diameter D1.

Instead of an arc of a circle, some other shape can be selected for the free spaces, as long as the distance from the minor thread diameter Dn is maintained.

Advantageously, the transition of a free space to the major thread diameter D1 can occur at an angle of from 120° to less than 180°, more particularly at an angle of from 150° to less than 180°.

If the proportion of free spaces on the threads is equal to between 20% and 75%, it is possible, on the one hand, to provide an adequate sufficiently load-bearing capacity of the thread and, on the other hand, to allow sufficient room for material to roll off.

A further object of the invention is the provision of a bolted joint comprising a nut and a bolt, in which the diameter d2 of the bolt is larger than the major thread diameter D1 and smaller than the outer circle diameter Da of the nut, and more particularly as large as the pitch diameter D2.

Advantageously, the outer circle diameter Da of the nut can be larger than the diameter d2 of the bolt.

The resulting bolted joint has a high self-retention effect that is achieved in a manner similar to thread-forming screws due to the elastic recovery of the material during rolling thereof and thus prevents the joint from self-loosening, e.g. under vibrations.

Yet another object of the invention is the provision of an unfinished part for the fabrication of a thread-producing nut, which nut is to be provided with a thread having a major thread diameter D1 and a minor thread diameter Dn, which blank is characterized in that the blank comprises a tap hole having an inner circle diameter Di that is smaller than the major thread diameter D1 to be produced, and the tap hole comprises free spaces that widen the tap hole from the inner circle diameter Di, which free spaces terminate on an outer circle diameter Da at a distance from the minor thread diameter Dn to be produced.

From such a blank it is possible to produce a nut of the invention by cutting a thread.

Advantageously, the free spaces are located at a distance from each other, although it is also possible for the free spaces in the blank to adjoin each other.

BRIEF DESCRIPTION OF THE DRAWINGS

The method of the invention is explained with reference to the drawings, in which:

FIG. 4A shows a detail X of the blank as shown in FIG. 4;

FIG. 4B shows a detail Y of the blank as shown in FIG. 4;

FIG. 6 shows the cross-section taken along the line I-I as shown in FIG. 5 having a thread infeed and perfectly formed, sharp-edged thread crests;

FIG. 7 shows the cross-section taken along the line II-II of the "Restnut" as shown in FIG. 5 for calibrating the tips of the bolt.

DESCRIPTION OF THE EMBODIMENTS OF THE INVENTION

Figure 1:
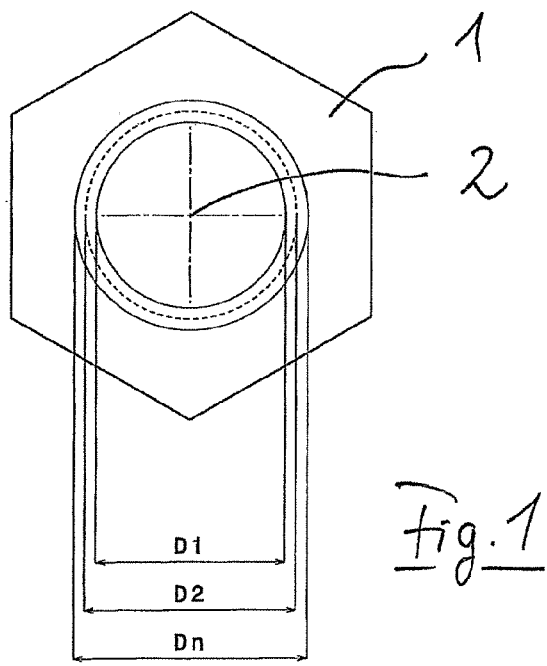
FIG. 1 shows a blank for a nut showing a screw thread to be produced comprising thread turns according to the prior art.

FIG. 1 shows a blank 1 for a nut comprising a screw thread to be produced comprising thread turns according to the prior art, which thread is approximately in the form of a metric thread in accordance with DIN 336, and the imaginary threads are located between a minor thread diameter Dn having the radius Rn, also referred to as the nominal thread diameter in accordance with ISO standards, and a major thread diameter D1 having the radius RI, also referred to as the core diameter of the nut thread in accordance with ISO, that are shown as continuous circles around a common center 2. The radii Rn and R1 (not shown) are assigned to the diameters Dn and D1 respectively and no further distinction is made in the following description between the terms radii and diameters, and the term deemed more suitable for the explanation of the invention is used below. This also applies to other diameters and radii shown in subsequent figures. FIG. 1 further shows a pitch diameter D2 having a radius R2 for the nut thread to be produced. This diameter is significant for the dimensions of the bolt or stud on which the nut is to be placed and it is explained with reference to F*ig*. 7.

Figure 2:
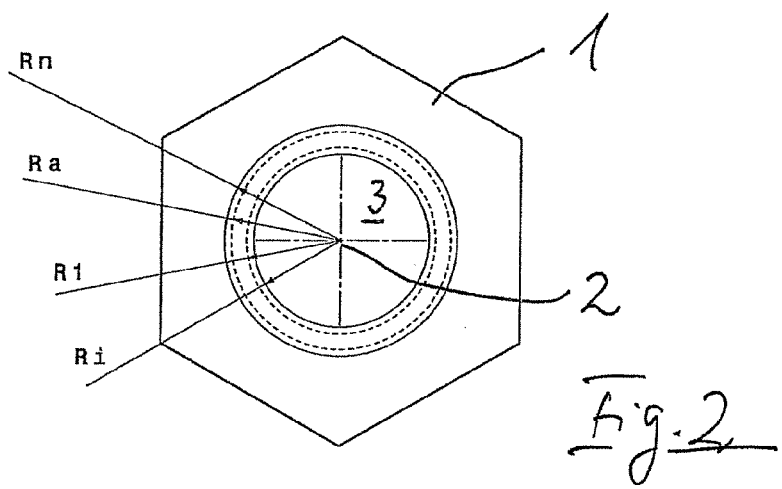
FIG. 2 shows the blank as shown in FIG. 1, in which a tap hole having an inner circle diameter Di and a radius Rib has been created.

FIG. 2 shows the blank 1 for a nut as shown in FIG. 1, in which a tap hole 3 having an inner circle diameter Di and a radius Ri is made, for example, by drilling, punching or reshaping. The inner circle diameter Di of the tap hole 3 having the radius Ri is smaller than the major thread diameter D1 having the radius R1 to be produced. Between the minor thread diameter Dn having the radius Rn to be produced and the major thread diameter D1 having the radius R1 that is to be produced, there is indicated an outer circle diameter Da having the radius Ra in the form of a dashed circle around the center 2 that is particularly significant for the configuration of the nut of the invention.

The pitch diameter D2 as shown in FIG. 1 and F*ig*. 7 having the radius R2 that is located between the major thread diameter D1 having the radius R1 and the outer circle diameter Da having the radius Ra is not shown in the figure.

Taken as a whole, Dn>Da>D2>D1>Di and accordingly Rn>Ra>R2>R1>Ri.

Figure 3:
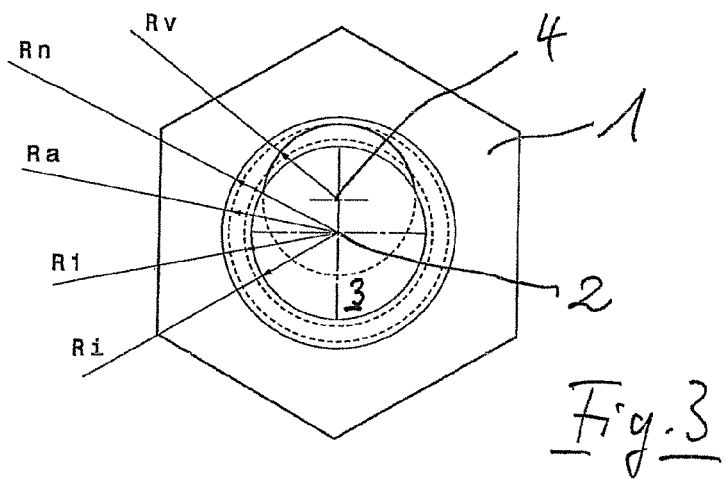
FIG. 3 shows the blank as shown in FIG. 2 illustrating a first change in the geometry of the tap hole.

FIG. 3 shows the blank as shown in FIG. 2 comprising a first change in the geometry of the tap hole, which has a rounded clearance having a radius Rv and a center 4 located at a distance from the center 2 of the tap hole 3. This change is caused, for example, by the tap hole 2 having been widened from its state as shown in FIG. 2 by a milling cutter having a radius Rv and a fulcrum 4.

The clearance Rv is smaller than the inner circle diameter Di having the radius Ri, preferably Rv is approximately half of Ri and the fulcrum 4 is displayed from the center 2 such that the clearance extends up to the outer circle diameter Da having the radius Ra and is located at a distance from the minor thread diameter Dn having the radius Rn to be produced. It can be seen here that the major thread diameter D1 having the radius R1 to be produced is undershot in the region of the clearance Rv.

Alternative methods for metal-cutting fabrication can also be used. Thus the tap hole, in particular, can be produced by shaping processes. The desired geometry of the tap hole can be achieved if the forming tool has a suitable geometry. Such shaping processes for the fabrication of nuts are well known in the prior art.

Figure 4:
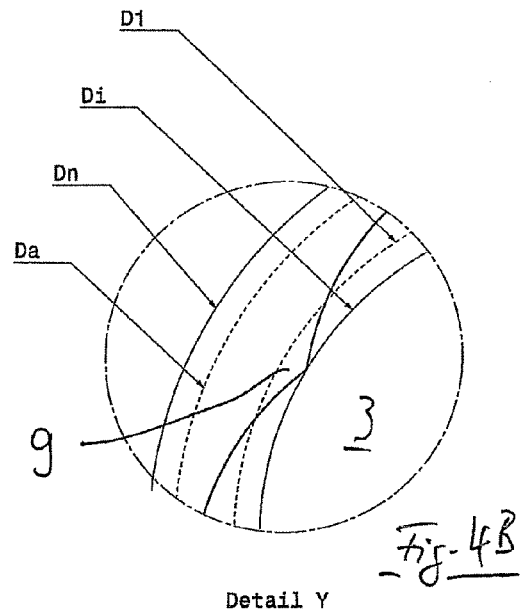
FIG. 4 shows the blank as shown in FIG. 3 illustrating a further change in the geometry of the tap hole.
Figure 4:
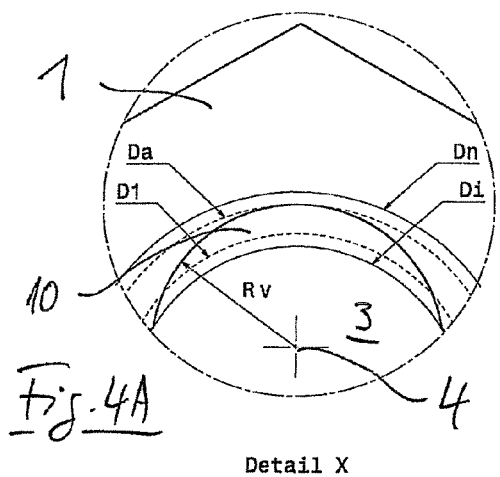
Figure 4:
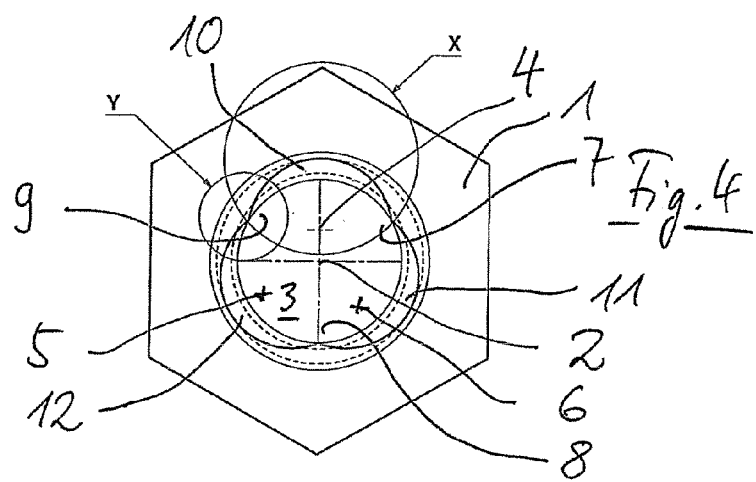

FIG. 4 shows the blank as shown in FIG. 3 comprising a further change in the tap hole geometry caused by the creation of additional clearances are made. The fulcrums 5 and 6 are likewise located at a distance from the center 2 such that the clearances again extend up to the outer circle diameter Da having the radius Ra and at a distance from the minor thread diameter Dn having the radius Rn to be produced.

The clearances are produced, for example, by means of the milling cutter having a radius Rv and rotation thereof about two additional fulcrums 5 and 6 in addition to the fulcrum 4.

It can be seen that regions 7, 8, 9 of the tap hole shown in FIG. 2 still exist that extend beyond the major thread diameter D1 having the radius R1 to be produced up to the inner circle diameter Di having the radius Ri. In the detailed illustration Y of the region 9 shown in FIG. 4, the location of the region 9 with respect to the different diameters Di, D1, Da, and Dn having the respective radii Ri, R1, Ra, and Rn can be seen significantly in FIG. 4B, and the diameters are shown as extending from the interior of the tap hole 3 towards the periphery.

FIG. 4 further shows that the regions 10, 11, 12 of the tap hole extend up to the outer circle diameter Da having the radius Ra as opposed to the major thread diameter D1 having the radius R1 to be produced, and the region 10 was already developed in FIG. 3. In the detailed illustration X of the region 10 shown in FIG. 4, the location of the region 10 with respect to the different diameters Di, D1, Da, and Dn having the respective radii Ri, R1, Ra, and Rn can be seen clearly in FIG. 4A, and the diameters are again shown as extending from the interior of the tap hole 3 towards the periphery. Furthermore, the center 4 and the clearance having a radius Rv are indicated, by means of which the region 10 is produced.

Although the clearances 10 to 12 adjoin each other, they can also be configured such that there are intermediate spaces having an unaltered inner circle diameter Di. The freedom of design here is very wide.

Figure 5:
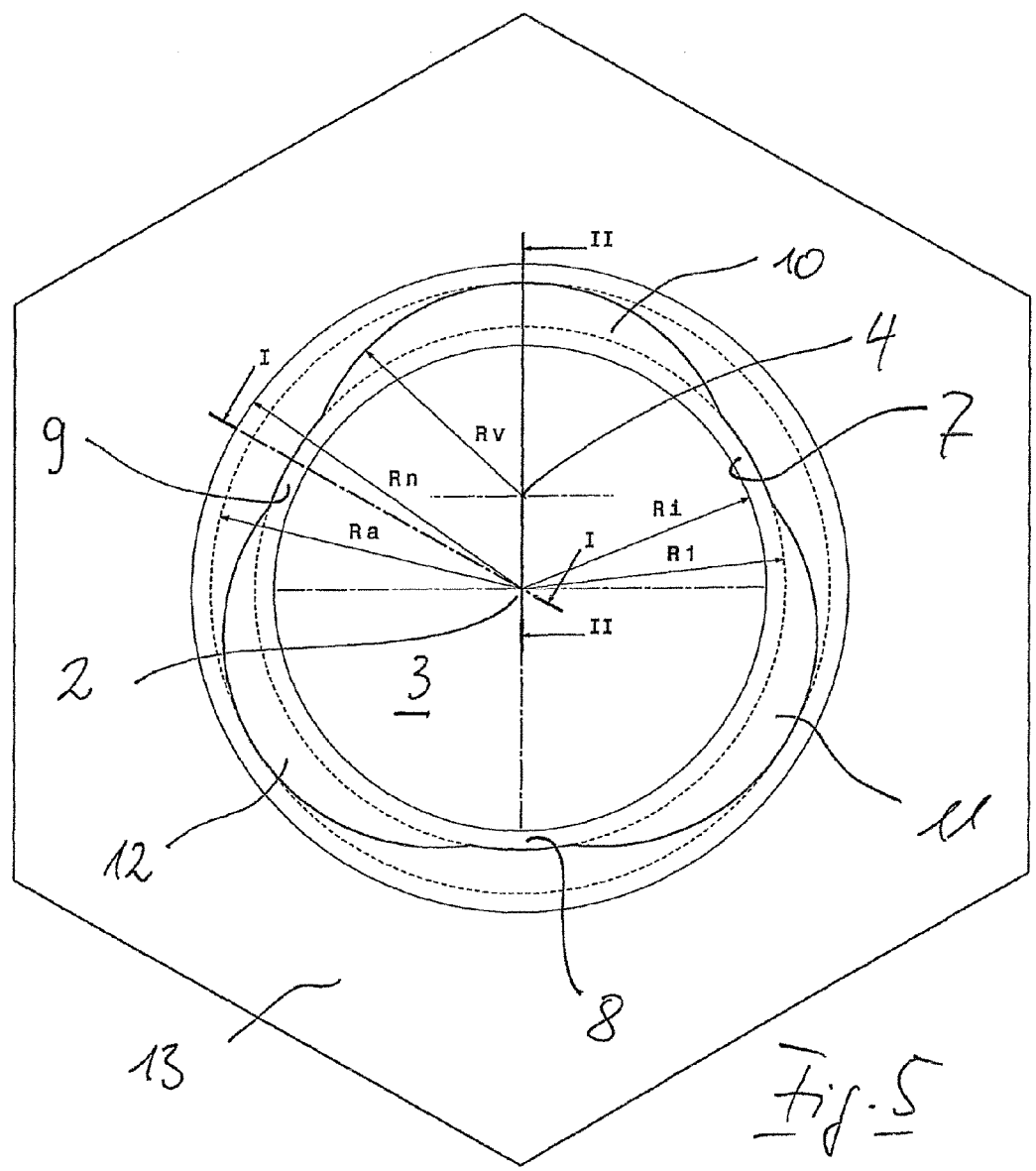
FIG. 5 shows a nut of the invention resulting from the blank as shown in FIG. 4 comprising another change in the geometry of the tap hole.

FIG. 5 shows the blank as shown in FIG. 4 illustrating yet another change in the tap hole geometry produced by shortening all of the regions 7, 8, 9 as shown in FIG. 4 from the inner circle diameter Di having the radius Ri to the now produced major thread diameter D1 having the radius R1 when the thread was cut by a tap so that a crest of a complete, sharp-edged thread is now located in these regions 7, 8, 9, see Fig. 6 below showing the cross-section I-I. Furthermore, when the thread was cut, the minor thread diameter Dn having the radius Rn and thus a nut 13 of the invention was produced.

Between the regions 7, 8, 9 located on the major thread diameter D1 having the radius R1, there are located the regions 10, 11, 12 that may be regarded as free spaces extending up to the outer circle diameter Da having the radius Ra. Due to these free spaces in the regions 10, 11, 12 that are recessed in relation to the major thread diameter D1, the regions 7, 8, 9 are perceived as protrusions, although they in fact correspond to the crests of a prior art thread located on the major thread diameter D1.

Furthermore, the free space in the region 10 and the protrusion in the region 7 of the nut 13 as shown in FIG. 5 are shown in the detailed illustration. The figure shows the center 2 of the tap hole 3, the center 4 that is displaced from the center 2 for the production of the free space extending up to the outer circle diameter Da having the radius Ra in the region 10 with the radius Rv and the protrusion in the region 7 located on the major thread diameter D1 having the radius R1. The thread extends to the minor thread diameter Dn having the radius Rn both in the region 7 and in the region 10. The inner circle diameter Di of the blank having the radius Ri, as shown in FIGS. 2 to 4, is no longer physically present in the nut thus produced, is shown only for the sake of completeness.

The angle at the transition point between the region 9 and the clearance 10 is approximately 170° as measured in the material of the nut.

FIG. 6 shows a cross-section taken along the line I-I through the region 9 as shown in FIG. 5. The nut 13 comprises in this region a thread 14 comprising a number of thread turns in the tap hole 3 that comprise a thread crest 15 facing the tap hole, thread flanks 16, 17, and a thread root 18. The thread crests 15 are perfectly formed and sharp-edged and they are located on the major thread diameter D1 having the radius R1, also referred to as the core diameter of the nut thread in accordance with ISO. The thread roots 18 are located on a minor thread diameter Dn having the radius Rn, also referred to as the nominal thread diameter in accordance with ISO.

Furthermore, the nut 13 is provided on the top side and underside with thread infeeds 19, 20 in order to facilitate attachment thereof to a bolt or stud.

FIG. 7 shows a cross-section taken along line II-II as shown in FIG. 5 through the region 10. The thread 14 comprises a plurality of thread turns, of which the thread crests 15' facing the tap hole are formed only imperfectly and in a substantially flat manner with the thread flanks 16, 17 still located towards the thread root 18. The thread crests 15' are located on the outer circle diameter Da with the radius Ra. The thread roots 18 are located on the minor thread diameter Dn having the radius Rn, also referred to as the nominal thread diameter in accordance with ISO.

The pitch diameter D2 having the radius R2 corresponds to the major diameter d2 of a bolt 21. The bolt 21 has an insertion ramp 22 at an angle Alpha of approximately 60° and the minor diameter ds having a radius Rs at the tip that is smaller than the major thread diameter D1. When only thread-forming is concerned, the insertion ramp 22 makes it easier to position the nut straight.

The nut 13 further has a corresponding sharp countersink 19, 20 or a thread infeed on both sides, or at least on the side facing the component to be clamped, i.e. in the direction of action of the nut, which countersink 19, 20 or thread infeed facilitates the positioning of the nut and thus also the forming of a thread. Therefore in the case of nuts of this type that are not aligned correctly and thus necessarily have such a countersink 19, 20 on both sides, the height of the nut can be increased appropriately in order to ensure a corresponding load-bearing capacity of the bolted joint. A greater height of the nut can also be desirable since the load-bearing thread turns do not extend over the entire periphery and a greater number of thread turns is to be produced in order to compensate for the non-bearing portion of the thread.

Preferably, the nut described above is made of hardenable steel, and a distinction must be made between the strength categories of the nuts depending on the purpose to which they are to be put. The strength category FK 10 in accordance with ISO 898-2 comprising conventional hardened and tempered carbon steel is suitable to a restricted extent for forming threads in soft materials having a strength Rm<700 N/mm2. The strength category FK 14 with a hardness of from 430 to 470 HV10 comprising, for example, bainitic hardened and tempered carbon steel with additives is particularly suitable for forming threads in higher-strength materials having a strength RM<1100 N/mm2.

As a blank before the introduction of the thread, the nut has a specific tap hole geometry that leaves defined free spaces on the resulting thread profile produced after the introduction of the thread in the nut body.

Thus the cross-section of the tap hole corresponds to that of a clover leaf, but other shapes are possible, in which the circumscribing outer circle diameter Da a approximates the nominal minor thread diameter Dn, and the inner circle diameter Di approximates the nominal major thread diameter D1 having the radius R1, but in each case falls short of the same.

A bolted joint is achieved when the nut 13 is placed over the bolt 21.

The outer circle diameter Da having the radius Ra is selected according to the nominal diameter of the nut so as to be slightly larger than the major diameter d2 of the bolt having the radius R2 in order, firstly, to thus create appropriate free spaces for the flow of material and, secondly, to act at the same time upon the crests of the bolt thread to be formed. This applies particularly to the procedure of smoothing and calibrating the thread crests resulting on the bolt thread in the remaining thread roots between the diameters Da and Dn of the nut.

At the same time, the major diameter D2 of the bolt 21 is smaller than the nominal minor thread diameter Dn of the nut 13 having the radius Rn and is of the order of the pitch diameter D2 of the thread.

The degree of widening of the tap hole can be varied according to the desired application, and accordingly larger free spaces are formed when the tap hole is widened to a considerable extent, which accommodates for the process of scraping threads which may have been clogged by a coating medium or removed material in the free spaces. If the tap hole is widened to a lesser extent, the proportion of the load-bearing thread is increased, which increases the suitability of the nut for thread forming. In general, the overall height of the nut in relation to the load-bearing portion of the thread can be adapted to comply with the required conditions.

Of course, more than, or less than, the three clearances illustrated can be provided in order to render the thread suitable for the intended application.

The nut of the invention can be attached both to threadless bolts or stubs and to already existing, coated threads and it produces the necessary thread conditions on the bolt by means of forming or cutting or clearing.

The invention claimed is:

1. A thread-foaming nut for positive, nonpositive and releasable connection to a stud or bolt, the thread-forming nut comprising:
a core hole provided with load-bearing thread turns and the thread turns are disposed on a peripheral surface of the core hole in a peripheral direction, wherein the thread turns, as regarded in the peripheral direction, partially comprise perfectly formed thread turns, wherein between perfectly formed regions of the thread turns there are provided free spaces comprising in terms of height imperfectly formed thread turns and wherein the load-bearing thread turns in the core hole lie at their roots on a minor thread diameter (Dn) and at their crests on a major thread diameter (D1), wherein the thread turns comprise, at least in part, free spaces that widen the core hole from the major thread diameter (Dn) towards the minor thread diameter (D1), and wherein the free spaces terminate at a distance from the minor thread diameter (D1) on an outer circle diameter (Da).

2. The nut according to claim 1, wherein the thread turns have a pitch diameter D2 situated between the minor thread diameter (Dn) and the major thread diameter (D1) and wherein the outer circle diameter (Da) is smaller than the minor thread diameter (Dn) and is at least as large as the pitch diameter (D2).

3. A bolted joint, comprising a nut according to claim 2 and a bolt, wherein a diameter (d2) of the bolt is larger than the major thread diameter (D1) and smaller than the outer circle diameter (Da) of the nut and is more particularly as large as the pitch diameter (D2).

4. The bolted joint according to claim 3, wherein the outer circle diameter Da of the nut is larger than the diameter (d2) of the bolt.

5. The nut according to claim 1, wherein the free spaces are in the form of an arc of a circle having a radius (Rv) and wherein the radius (Rv) is smaller than approximately 35% of the major thread diameter (D1), wherein the free space comprises a center that is displaced from a center of the core hole by not more than approximately 75% of the major thread diameter (D1).

6. The nut according to claim 5, wherein the radius (Rv) is smaller than approximately 25% of the major thread diameter (D1).

7. The nut according to claim 1, wherein transition of a free space to the major thread diameter (D1) occurs at an angle of from approximately 120° to less than approximately 180°.

8. The nut as defined in claim 1, wherein proportion of the free spaces in the thread turns is between approximately 20% and approximately 75%.

9. An unfinished part for the fabrication of a thread-forming nut according to claim 1, wherein the nut to be fabricated is to be provided with a thread having a major thread diameter (D1) and a minor thread diameter (Dn), wherein the unfinished part comprises a core hole having an inner circle diameter (Di) smaller than the major thread diameter (D1) to be fabricated and wherein the core hole comprises free spaces that widen the core hole away from the inner circle diameter (Di), wherein the free spaces terminate at a distance from the minor thread diameter (Dn) to be fabricated on an outer circle diameter (Da).

10. The unfinished part according to claim 9, wherein the free spaces are spaced at intervals.

11. The nut according to claim 1, wherein the stud or bolt is a cylindrical stud or bolt.

* * * * *